United States Patent [19]
Rhodes

[11] Patent Number: 6,037,744
[45] Date of Patent: Mar. 14, 2000

[54] VEHICLE TIME DELAY BATTERY CHARGER

[76] Inventor: Michael E. Rhodes, Rte. 3, Box 930, Big Fork, Minn. 56028

[21] Appl. No.: 09/048,548

[22] Filed: Mar. 26, 1998

[51] Int. Cl.[7] .................................................. H02J 7/00
[52] U.S. Cl. ............................................ 320/104; 320/103
[58] Field of Search .................................... 320/104, 103; 322/20, 25, 27, 28, 14, 17; 307/10.7, 10.8

[56] References Cited

U.S. PATENT DOCUMENTS

| | | | |
|---|---|---|---|
| 5,698,967 | 12/1997 | Baer et al. | 320/152 |
| 5,747,970 | 5/1998 | Johnson, Jr. et al. | 320/151 |
| 5,952,813 | 9/1999 | Ochiai | 320/104 |

*Primary Examiner*—Peter S. Wong
*Assistant Examiner*—Lawrence Luk

*Attorney, Agent, or Firm*—Nawrocki, Rooney & Sivertson, P.A.

[57] ABSTRACT

A device for providing vehicle battery power to rechargeable devices in vehicles, such as portable radios, cell phones, flashlights and laptop computer terminals left in patrol vehicles. The device has battery power as input, and outputs power to rechargeable devices while the vehicle is on, and for a time period thereafter. One device has multiple outputs having corresponding time periods. One device includes an engine sensor, a timer, a first switch and a second switch, with the first switch coupled to a first rechargeable device through a first terminal pair and the second switch coupled to a second rechargeable device through a second terminal pair. Each terminal pair can have a unique time period and, in some embodiments, can have one of a set number of time periods selected with a jumper.

15 Claims, 4 Drawing Sheets

Fig. 3

COMPONENTS

| QUANTITY | COMPONENT | REF. DESIGNATORS |
|---|---|---|
| 5 | DIODE | D1-D5 |
| 1 | ZENER DIODE | ZD1 |
| 2 | TRANSISTOR | Q1, Q2 |
| 2 | CAP (0.1 UF) | C1, C7 |
| 1 | CAP (0.33 UF) | C3 |
| 1 | ELEC. CAP (47 UF) | C4 |
| 2 | CAP (18 PF) | C5, C6 |
| 1 | CRYSTAL | Y1 |
| 1 | VOLTAGE REGULATOR | VR1 |
| 1 | MOV | MOV1 |
| 1 | I. C. MICROCHIP | P1 |
| 1 | ELEC. CAP (100 UF) | C2 |
| 1 | SPST RELAY | K1 |
| 1 | DPST RELAY | K2 |

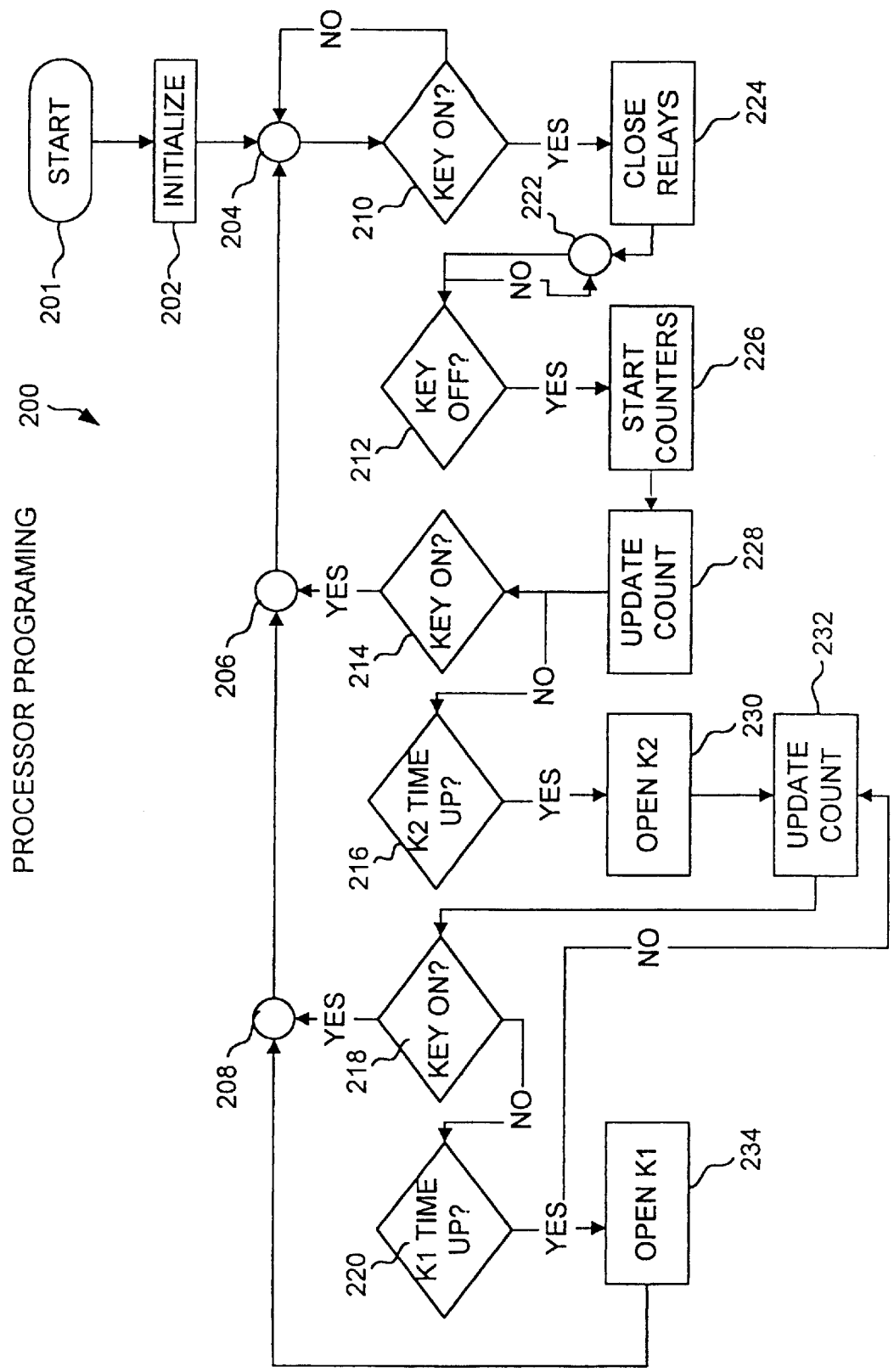

VEHICLE TIME DELAY BATTERY CHARGER

FIELD OF THE INVENTION

The present application is related to devices and methods for providing power to vehicle rechargeable battery systems. Specifically, the present invention is related to vehicle devices and methods for providing power to rechargeable devices such as flashlights.

BACKGROUND OF THE INVENTION

Vehicles increasingly contain rechargeable devices, typically having NiCad batteries. In particular, utility trucks, police vehicles, and public safety vehicles carry a large number of devices including rechargeable flashlights, cell phones, portable radios, and computers. These devices may include battery voltages of less then 12 Volts, but have charging circuits adapted to accept 12 Volts for charging from vehicle 12 Volt batteries.

The rechargeable device charging circuits are often designed for small size or low cost, and may be inefficient, drawing more power than necessary to charge the devices. Even when efficient, the charging devices often continually charge the device batteries, after the devices are fully charged. The unneeded energy is dissipated as heat. Other devices, such as two-way radios, mobile dispatch terminals and siren controls do not typically use rechargeable batteries, but can continue to draw power if left on.

In commercial vehicles, the rechargeable devices are present in moderate numbers, and left in vehicles overnight, even over weekends. The draw on the vehicle batteries accumulates over time, and can leave vehicles with dead batteries. The problem is exacerbated in cold weather, as battery capacity decreases with decreasing temperature. Public safety vehicles left near the driver's residence rather than near central garages are particularly inconvenienced, as having the vehicle jump started or quickly charged may be problematic. In a typical scenario, a police vehicle in a remote area cannot respond because of a dead battery due to several devices having been charged for long periods, similar to leaving a dome light on.

The typical daily cycle for public safety vehicles such as patrol vehicles does not lend itself to the cycle of rechargeable batteries. Most patrol vehicles and the accessories inside the car are in use during the officers shift, and then need to be recharged when the vehicle is off. If the accessories are wired up to constantly recharge, then during engine off periods the vehicles battery is being discharged and will eventually lead to vehicle battery depletion. If the accessories are wired up to only recharge while the vehicles motor is running, the batteries in the accessories may not be fully charged, depending on vehicle "on" time.

What is desirable and has not been provided is a device for supplying power to rechargeable devices for a limited time after the ignition switch is turned off. What has not been provided is a device for supplying power to multiple rechargeable devices for differing time periods simultaneously. A configurable device delivering power for user selectable time intervals also has not been provided.

BRIEF DESCRIPTION OF THE DRAWINGS

FIG. 3 is a component list for use in building the vehicle device delay time of FIG. 2; and FIG. 4 is a flow chart of software for one embodiment where the timing function is performed by a programmable computer chip.

SUMMARY OF THE INVENTION

Figure 1:
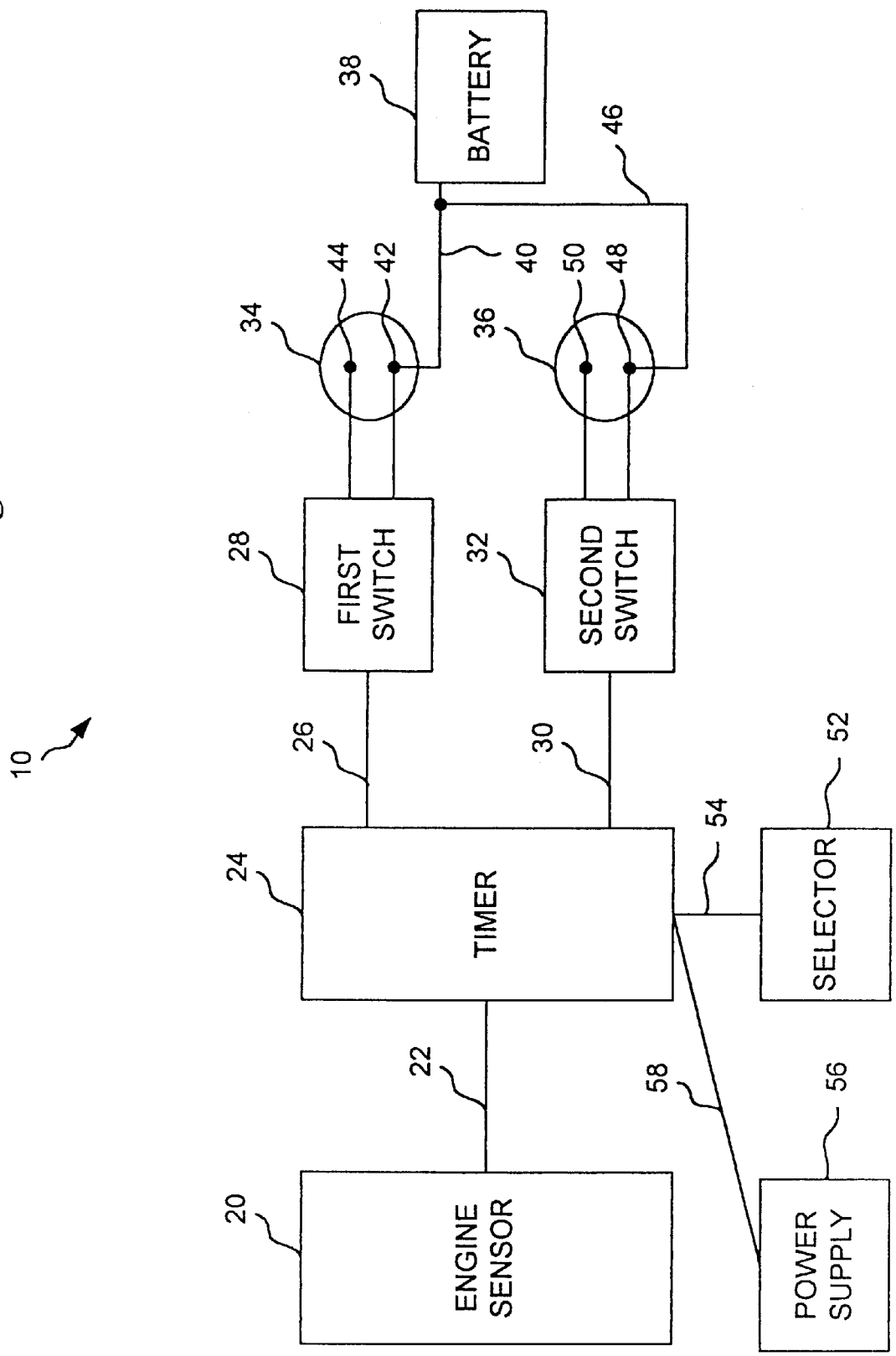
FIG. 1 is a block diagram of a vehicle delay timer.

The present invention provides a device for providing vehicle battery power to rechargeable devices such as flashlights, mobile radios, mobile dispatch terminals, cell phones, and computers. The power in one embodiment is provided while the engine is running and for a given time period after the engine is shut off. One device includes multiple outputs each having a corresponding time period. The device is particularly suited for use in public safety vehicles such as patrol vehicles. One device includes an engine sensor coupled to a timer which in turn is coupled to a first switch and a second switch, which are coupled to a first terminal pair and a second terminal pair, respectively. A selector is coupled to the timer is one embodiment, to select between a set of fixed, preset values to use as time periods. In a preferred embodiment, jumpers are used to select between terminals on a terminal block. In a preferred device, the entire device is mounted within a terminal block, having the electronics within and the terminal blocks in terminal strips on the face. The terminal block can be mounted within a vehicle, and powered with a vehicle battery connection.

The timer operates by allotting a time for each circuit to remain powered after the patrol vehicle has been turned off. Hence, the time gives the accessories (and its batteries) time to recharge and then automatically disables that circuit, saving the vehicle battery. That time of recharge can be either two or four hours for two circuits, and eight or ten hours for one circuit. The two hour recharge setting can be used for cellular phones, portable radio, 2-way radios, and laptop computers. The two-hour recharge setting can also be used to power non-rechargeable devices such as Mobile Dispatch Terminals for two hours after the vehicle was turned off. The term "rechargeable device timer" as used herein refers to a preferred use of the device, not a device limited to powering rechargeable devices. The four hour recharge setting can be used for the same thing as the two hour setting, but with enough time for those items that require the extra recharge time. The eight and then ten hour recharge setting is for use by rechargeable flashlights and other devices needing the longer recharge time. Recharge times or cycles are not necessarily confined to the times used in this description because of the programming capabilities.

In a typical patrol vehicle using the Programmable Timer the officer would select the program settings that best match his accessories recharge cycles. As an example, if the officer had a computer, portable radio, and a portable flashlight connected to the timer, the portable radio and computer would continue to receive power for two (or four) hours after the ignition key is turned off. The portable flashlight however, continues to receive power for eight (or ten) hours after the ignition key is turned off. This means the officer will be able to use his vehicle (no dead vehicle battery), and all of the accessories will be fully charged and ready for use.

DETAILED DESCRIPTION OF THE PREFERRED EMBODIMENTS

FIG. 1 illustrates a block diagram of vehicle delay timer 10 having an engine sensor 20 outputing an engine signal 22 which is coupled to a timer 24 which in turn outputs a first response signal 26 and a second response signal 30. First response signal 26 is coupled to a first switch 28 and a first terminal pair 34. Second response signal 30 is coupled to a second switch 32 and a second terminal pair 36. First terminal pair 34 has first connection 42 and a second connection 44. Second terminal pair 36 has a first connection 48 and a second connection 50. First connections 42 and 48 can be used to connect a 12 Volt supply line, and second connections 44 and 50 can be used to connect a supply line to a device. Ground returns, not requiring illustration, are not shown. A vehicle battery 38 has a first supply wire 40 coupled to first connector 42 and a second supply wire 46 coupled to first connector 48. Also illustrated is a selector 52 having a selector output 54 coupled to timer 24. A power supply 56 is illustrated supplying a supply line 58. Power supply 56 is used to power first switch 28 and second switch 32 in some embodiments.

In operation, engine sensor 20 senses engine status and provides engine signal 22 to timer 24 which can detect on and off engine states. Engine sensor 20 in one embodiment is a wire connected to an ignition switch. Timer 24 can have multiple time periods stored within. In the embodiment shown, timer 24 contains a first time period for first switch 28 and a second time period for second switch 32. In one embodiment, after the first period elapses, timer 24 provides first output 26 to first switch 28 while engine sensor 20 indicates the engine is running. After engine sensor 20 is turned off, timer 24 only provides an "ON" signal to first switch 28 until the first timer has elapsed whereupon the signal goes to "OFF." First switch 28 provides a closed circuit between first connector 42 and second connector 44 only for so long as timer output 26 is in the "ON" state. The second time period, second switch, and second terminal pair operate in a manner similar to the first, but can have a different time period.

In one embodiment, selector 52 is used to set the first and second time periods. In one embodiment, selector 52 selects between an 8 and a 10 hour period for the first time period and a 2 and a 4 hour time period for the second time period. In one embodiment, selector 52 is a terminal pair, wherein a preset, higher first time period is selected when the terminals are jumpered and a preset, lower period is selected when the terminals are not jumpered.

Figure 2:
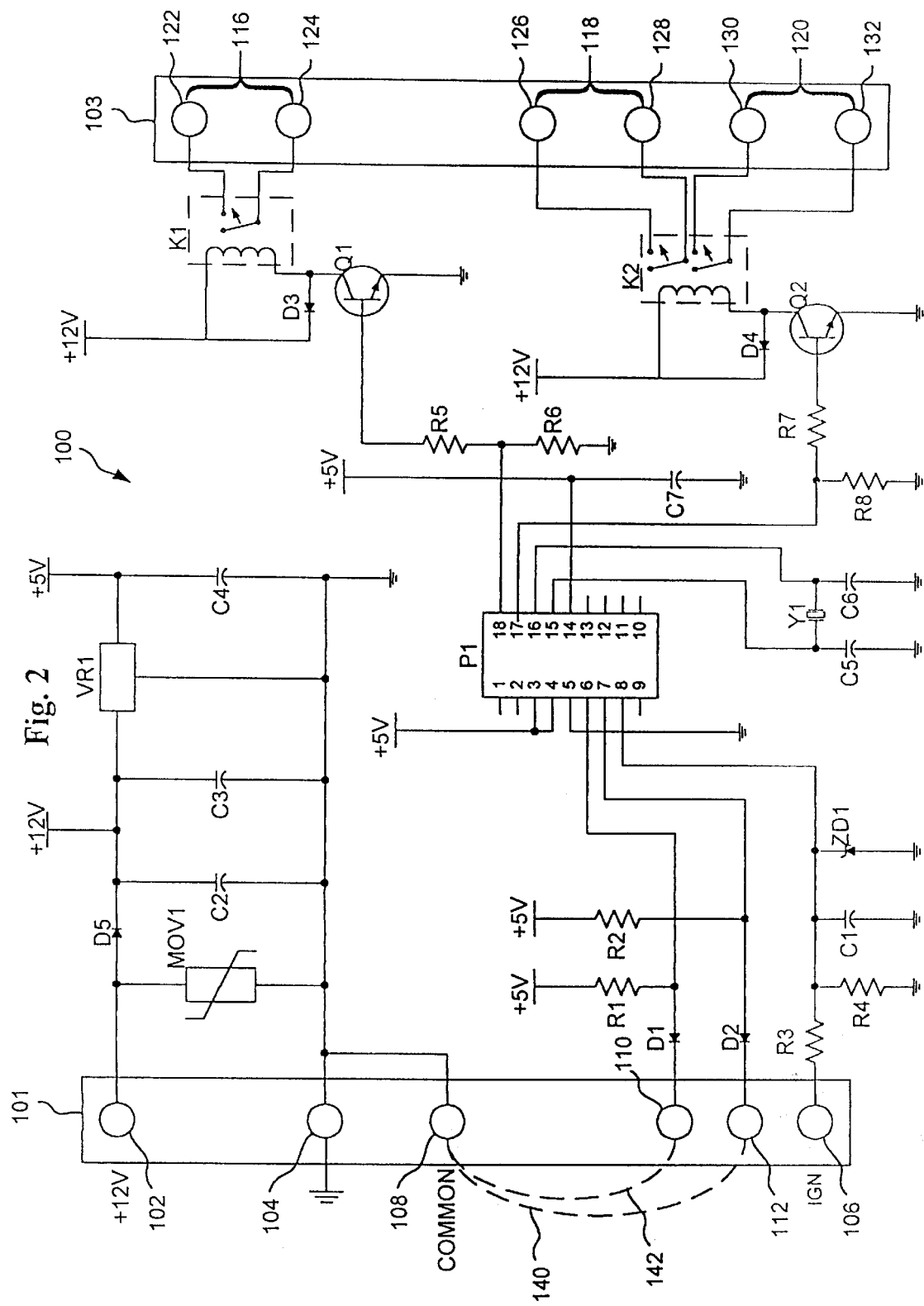
FIG. 2 is a circuit diagram of a vehicle delay timer.

Referring now to FIG. 2, a rechargeable device timer 100 is illustrated, lying between a first connector strip 101 and a second connector strip 103. 12 Volt battery power is provided by a battery (not shown) connected to a first battery power terminal 102 and a second battery power terminal 104. A wire from an ignition switch is typically connected to an ignition terminal 106. A common selector terminal 108 can be jumpered to a first selector terminal 110 to select between one of two time periods for a first time period and a second selector terminal 112 can be used to select between one of two time periods for a second time period.

Second connector strip 103 includes a first terminal pair 116 having a first terminal 124 and a second terminal 122, a second terminal pair 118 having a first terminal 128 and a second terminal 126, and a third terminal pair 120 having a first terminal 132 and a second terminal 130. In the embodiment shown, first terminal pair 116 operates according to a first time period and second and third terminal pairs 118 and 120 operate according to a second time period. First terminals 124, 128 and 132 can be connected to a source of battery power, and second terminals 122, 126 and 130 can be connected to provide power to rechargeable devices.

Referring now to device 100 in detail, power is supplied to terminal 102 from the battery to +12V and the return path for current is through the ground terminal 104 of first connector strip 101. An MOV, MOV1 is used to remove transient surges from the power supply voltage. A diode D5 prevents the timer from being powered up with reverse polarity on the power supply inputs. A capacitor C2 is for filtering low frequency ripple from the power supply voltage, while a capacitor C3 is for filtering high frequency noise to ground. A voltage regulator, VR1, such as National LM29312-5.0, divides +12V to provide +5V out.

In the embodiment shown, the timer includes a microprocessor P1 such as a PIC16C54A-041/P, a first relay K1, and a second relay K2. Battery power is supplied to the common terminals on relays K1 and K2. The normally open contacts of the relays will close only when they are energized. The time period for which the relays will continue to supply power is programmable by P1.

In a preferred embodiment, for relay K1, a time period of either 8 or 10 hours may be selected and K2 can be either 2 or 4 hours. First selector terminal 110 is used to determine the time period for relay K2. If terminal 110 is not tied to common selector terminal 108 by an external jumper 142, then no current will flow in resistor R1 and the voltage at P1 terminal 6 will be +5V (logic level high). The time period for K2 will then be 2 hours in a preferred embodiment.

The first microprocessor input pin (P1 terminal 6) is used to determine the time period for relay K2. If second selector terminal 112 is tied to selector common terminal 108 by external jumper 140, current will flow from +5V through resistor R2, Diode D2, the external jumper and to ground through the common input. This will cause the voltage at P1 terminal 7 to be logic level low. The time period for K2 will then be 4 hours in a preferred embodiment. Diode D1 is used to prevent any current flow from terminal 110 to resistor R1 or microprocessor P1 which may be caused by accidentally jumping terminal 110 to +12V.

The first input pin (P1 terminal 7) is used to determine the time period for relay K1. If terminal 112 is not tied to selector common terminal 108 by external jumper 140, then no current will flow in resistor R2 and the voltage at P1 terminal 7 will be +5V (logic level high). The time period for K1 will then be 8 hours. If selector terminal 112 is tied to selector common terminal 108 by external jumper 140, current will flow from +5V through resistor R2, Diode D2, the external jumper and to ground through the common input terminal 108. This will cause the voltage at P1 terminal 7 to be logic level low. The time period for K1 will then be 10 hours. Diode D2 is used to prevent any current flow from terminal 112 to resistor R2 and microprocessor P1 which may be caused by accidentally jumping the terminal 112 to +12V.

After powering up, microprocessor P1 checks the state of the inputs from terminal 110 and 112 on pins 6–7 and the program determines the state of the two outputs for relays K1 and K2 on pins 17 and 18.

The third input terminal (P1 terminal 8) is used to determine the status of the output terminals 17 and 18 (P1) which control relays K1 and K2. When the ignition is off on terminal 106, no current flows in resistors R3 and R4. The voltage level at P1 terminal eight will be 0 VDC (a logic level low). When the ignition is on, current will flow from the battery through the ignition switch and resistors R3 and R4 to ground. The voltage level at P1 terminal 8 will then be approximately 4.3 VDC (a logic level high). Capacitor C1 is used to filter any switch noise caused by the ignition switch to ground.

Zener diode ZD1 is used to prevent the voltage at P1 terminal 8 from exceeding the +5V supplied to the microprocessor P1. If the voltage on P1 terminal 8 rises above the zener voltage of ZD1 (4.7 VDC), ZD1 will conduct and current will flow from the cathode through to the anode and to ground. The additional current flow will lower the voltage on P1 terminal 8 to the zener voltage of 4.7 volts.

Crystal Y1 and capacitors C5 and C6 combine with the internal circuitry of microprocessor P1 to form an oscillator circuit on terminals 15 and 16 of P1. The frequency of oscillation is used by the microprocessor P1 for internal event timing. Input terminal 3 and 4 of P1 are unused and tied to +5V to keep them at a known inactive state. This will prevent them from affecting program operation. Capacitor C7 is used to filter any high frequency electrical noise from the +5V supply to P1 microcontroller terminal 14.

The first output, P1 terminal 18 controls relay K1. When the output is at 0 volts (logic level low) no current flows in the base-emitter junction of transistor Q1. Q1 is off and the coil of K1 is de-energized. The contacts of K1 between terminal 122 and terminal 124 are open. When the output is at +5V (logic level high) current flows from P1 terminal 18 through R6 to ground. This voltage then forward biases Q1 and current flows from P1 terminal 18 through R5 and the base-emitter junction of Q1. This turns on transistor Q1 and current flows from +12V through relay coil K1 into the collector of Q1 and out of the emitter to ground. The normally open contacts of K1 close and continuity is established between terminal 122 and 124.

Diode D3 is used to prevent the counter emf generated in the coil of K1 from exceeding the supply voltage of +5V. When the coil in K1 has been energized the current flow through the coil stores energy in a magnetic field. When the current flow is stopped the collapsing magnetic field produces a voltage or counter emf which often times exceeds that of the supply voltage. When this happens current will flow from the coil to the anode of D3 and to the +5V supply until the stored energy is dissipated.

The second output, P1 terminal 17 controls relay K2. When the output is at 0 volts (logic level low) no current flows in the base-emitter junction of transistor Q2. Q2 is off and the coil of K2 is de-energized. The double pole contacts of K2 between terminals 126 and 128, and 130 and 132 is open. When the output is at +5V (logic level high) current flows from P1 terminal 17 through R6 to ground. This voltage then forward biases Q2 and current flows from P1 terminal 17 through R7 and the base-emitter junction of Q2. This turns on transistor Q2 and current flows from +12V through relay coil of K2 into the collector of Q2 and out of the emitter to ground. The normally open contacts of K2 close and continuity is established between terminals 126 and 128, and 130 and 132. Diode D4 is used to prevent the counter emf generated in the coil of K2 from exceeding the supply voltage of +5V. When the coil in K2 has been energized the current flow through the coil stores energy in a magnetic field. When the current flow is stopped the collapsing magnetic field produces a voltage or counter emf which often times exceeds that of the supply voltage. When this happens current will flow from the coil to the anode of D4 and to the +5V supply until the stored energy is dissipated.

The delay times for the timer are programmed into P1 and can be reprogrammed with new instructions and P1 microprocessor if necessary. Delay times as mentioned in this article are for a preferred embodiment. A list of components used in the embodiment of FIG. 2 is listed in FIG. 3.

Referring now to FIG. 4, a flowchart for a processor program 200 running in microprocessor P1 is illustrated. The program starts with a START step 201, typically on power-up, proceeding to an INITIALIZE step 202 which can include initialization of registers, variables, timers, and counters. The program proceeds through a common node 204 and to a KEY ON decision step 210, proceeding to a CLOSE RELAYS step 224 if the key is OFF else to looping to common node 204. In CLOSE RELAYS step 224, relays K1 and K2 are closed, the program proceeding through common node 222 to a KEY OFF decision step 212, then to a START COUNTERS step 226 if the key is newly off, else looping back to common node 222.

Counters are started or initialized in START COUNTERS step 226, and updated or incremented in UPDATE COUNT step 228, then proceeding to a KEY ON decision step 214, then proceeding to a K2 TIME UP decision step 216 if the key is not on, else to common node 206. If the K2 TIME UP step is true, then program flow proceeds to an OPEN K2 step 230 which opens relay K2, and program flow proceeds to an UPDATE COUNT step 232 which updates the count for relay K1, then proceeding to a KEY ON decision step 218, then to a common node 208 if the key is on, else to a K1 TIME UP decision step 220. If K1 time is up, then the program proceeds to an OPEN K1 step 234 which opens relay K1, else to common node 208, which returns to common node 204 and begins the major program loop again.

Numerous characteristics and advantages of the invention covered by this document have been set forth in the foregoing description. It will be understood, however, that this disclosure is, in many respects, only illustrative. Changes may be made in details, particularly in matters of voltage, components, and reversal of on and off signal states where appropriate without exceeding the scope of the invention. The inventions's scope is, of course, defined in the language in which the appended claims are expressed.

What is claimed is:

1. An apparatus for switching one or more terminal pairs in an automobile after one or more time periods, the one or more time periods beginning once an automobile engine is turned off, comprising:

a. engine sensing means;

b. timing means coupled to said engine sensing means, said timing means receiving an engine signal from said engine sensing means when the automobile engine is turned off and providing each one of one or more responses after a corresponding one of the one or more time periods has ended; and c. switching means coupled to said timing means for receiving the one or more responses from said timing means, each one of the one or more responses corresponding to a number of the one or more terminal pairs, said switching means switching said number of the one or more terminal pairs once a corresponding one of the one or more responses is received.

2. An apparatus according to claim 1 wherein the switching means is comprised of one or more relays, each relay coupled to the timing means for receiving the corresponding one of the one or more responses and further coupled to the corresponding number of the one or more terminal pairs, each relay switching the corresponding number of the one or more terminal pairs from a closed position to an open position once the corresponding one of the one or more responses is received, each terminal pair having a first terminal and a second terminal, each terminal pair being in said closed position electrically coupling said first terminal to said second terminal.

3. An apparatus according to claim 1 wherein the timing means further comprises a selection means for selecting each one of the one or more time periods, the timing means having a number of time periods which are selectable by said selection means, each one of the one or more responses corresponding to selected ones of the one or more time periods.

4. An apparatus according to claim 3 wherein the timing means is a microprocessor, said microprocessor being programmed to provide each one of the one or more responses after the corresponding one of the one or more time periods has ended.

5. An apparatus according to claim 1 wherein the engine sensing means is an automotive engine switch, said automotive engine switch being switched to an off position to turn off the automobile engine, said automotive engine switch providing the engine signal to the timing means when said automotive engine switch is switched to said off position.

6. An apparatus for switching one or more terminal pairs in an automobile having an engine sensor, comprising:

a. a microprocessor coupled to the engine sensor, said microprocessor initiating one or more time periods after an engine signal from the engine sensor is received indicating that the automobile engine is not running, each one of one or more responses being provided after a corresponding one or more time periods has ended; and b. one or more switches coupled to said microprocessor, each one of said one or more switches switching a number of the one or more terminal pairs once said corresponding one of said one or more responses is received.

7. An apparatus according to claim 6 wherein the one or more switches switch the number of the one or more terminal pairs from a closed position to an open position once the corresponding one of the one or more responses is received, each terminal pair having a first terminal and a second terminal wherein each terminal pair being in said closed position electrically couples said first terminal to said second terminal.

8. An apparatus according to claim 7 further comprising a battery, the first terminal of each one of the one or more switches being electrically coupled to said battery.

9. An apparatus according to claim 8 wherein each one of the one or more switches comprises:

a. a relay having the first terminal and the second terminal; and b. a transistor electrically coupled to the microprocessor and the relay for switching the relay from a closed position to an open position once the corresponding one of the one or more responses is received so that the first terminal is no longer electrically coupled to the second terminal.

10. An apparatus according to claim 6 wherein the one or more time periods are predetermined and are selected within the microprocessor by grounding one or more microprocessor input pins.

11. An apparatus according to claim 10 wherein each one of the one or more time periods is within a range of two to eight hours.

12. An apparatus for switching one or more terminal pairs in an automobile, comprising:

a. a timing controller for initiating one or more predetermined time periods once an automobile engine is turned off, each one of one or more responses being provided after a corresponding one of the one or more predetermined time periods has ended; and b. one or more switches coupled to said timing controller, each one of said one or more switches switching a number of the one or more terminal pairs once said corresponding one of said one or more responses is received.

13. An apparatus according to claim 12 wherein the one or more switches switch the number of the one or more terminal pairs from a closed position to an open position once the corresponding one of the one or more responses is received, each terminal pair having a first terminal and a second terminal wherein each terminal pair being in said closed position electrically couples said first terminal to said second terminal.

14. An apparatus according to claim 13 further comprising a battery, the first terminal of each one of the one or more switches being electrically coupled to said battery.

15. An apparatus according to claim 14 wherein each one of the one or more switches comprises:

a. a relay having the first terminal and the second terminal; and b. a transistor electrically coupled to the timing controller and to the relay for switching the relay from a closed position to an open position once the corresponding one of the one or more responses is received so that the first terminal is no longer electrically coupled to the second terminal.

* * * * *